United States Patent
Morris et al.

(10) Patent No.: US 8,570,772 B2
(45) Date of Patent: Oct. 29, 2013

(54) ISOLATED FLYBACK CONVERTER WITH EFFICIENT LIGHT LOAD OPERATION

(75) Inventors: John D. Morris, Sunnyvale, CA (US); Michael G. Negrete, Mountain View, CA (US); Min Chen, Milpitas, CA (US)

(73) Assignee: Linear Technology Corporation, Milpitas, CA (US)

( * ) Notice: Subject to any disclaimer, the term of this patent is extended or adjusted under 35 U.S.C. 154(b) by 44 days.

(21) Appl. No.: 13/359,447

(22) Filed: Jan. 26, 2012

(65) Prior Publication Data

US 2013/0194836 A1 Aug. 1, 2013

(51) Int. Cl.
 *H02M 3/335* (2006.01)
(52) U.S. Cl.
 USPC .......... 363/21.14; 363/21.17; 363/89
(58) Field of Classification Search
 USPC .......... 363/21.14, 21.06, 52, 55, 84, 89, 21.17
 See application file for complete search history.

(56) References Cited

U.S. PATENT DOCUMENTS

| | | | |
|---|---|---|---|
| 7,254,044 B2 * | 8/2007 | Perry et al. | 363/20 |
| 7,450,402 B2 * | 11/2008 | Jitaru | 363/20 |
| 7,463,497 B2 | 12/2008 | Negrete | |
| 7,471,522 B2 | 12/2008 | Ng et al. | |
| 7,869,231 B2 * | 1/2011 | Cohen | 363/21.14 |
| 7,906,942 B2 * | 3/2011 | Sugahara et al. | 323/223 |
| 7,952,894 B2 * | 5/2011 | Lin et al. | 363/21.06 |
| 8,154,236 B2 * | 4/2012 | Kimura | 318/400.26 |
| 2010/0164579 A1 * | 7/2010 | Acatrinei | 327/172 |
| 2011/0267024 A1 * | 11/2011 | Halberstadt | 323/304 |

OTHER PUBLICATIONS

"Isolated Flyback Converter without an Opto-Coupler," LT3573 Linear Technology Corporation Data Sheet, pp. 1-26.

* cited by examiner

*Primary Examiner* — Matthew Nguyen
*Assistant Examiner* — Kyle J. Moody
(74) *Attorney, Agent, or Firm* — Patent Law Group LLP; Brian D Ogonowsky

(57) ABSTRACT

A flyback converter uses primary side sensing to sense the output voltage for regulation feedback. Such sensing requires a predetermined minimum duty cycle even with very light load currents. Therefore, such a minimum duty cycle may create an over-voltage condition. In the flyback phase, after a minimum duty cycle of the power switch at light load currents, a synchronous rectifier turns off approximately when the current through the secondary winding falls to zero to create a discontinuous mode. If it is detected that there is an over-voltage, the synchronous rectifier is turned on for a brief interval to draw a reverse current through the secondary winding. When the synchronous rectifier shuts off, a current flows through the primary winding via a drain-body diode while the power switch is off. Therefore, excess power is transferred from the secondary side to the power source to reduce the over-voltage so is not wasted.

19 Claims, 3 Drawing Sheets

ISOLATED FLYBACK CONVERTER WITH EFFICIENT LIGHT LOAD OPERATION

FIELD OF THE INVENTION

This invention relates to DC-DC flyback converters using a synchronous rectifier and, in particular, to such a flyback converter that uses primary side sensing to detect an output voltage.

BACKGROUND

DC-DC flyback converters using synchronous rectifiers are well known. When isolation between the input and output stage is required, the output voltage can be sensed by various methods for regulation feedback. Some ways to convey the output voltage while maintaining isolation include using an optocoupler or using a third winding on the primary side of the transformer. However, those ways require additional circuitry, space, power, and cost. A more elegant way of detecting the output voltage is to sense a voltage at a terminal of the power switch when the power switch is turned off during the discharge (or flyback) cycle of the converter. Such a sensed voltage is substantially proportional to the output voltage. However, such a scheme requires a minimum duty cycle in order for the sensing to be accurate, since current must flow in the secondary winding in order to create the primary side sense voltage. Such a scheme also generally requires a minimum load in the form of a load resistor so as to draw a minimum current during the discharge cycle in the event the actual load is in a standby mode drawing little or no current.

If there were no minimum load resistor and the actual load went into a very light current standby mode, the minimum duty cycle may be greater than that needed to achieve a regulated output voltage, and the output voltage would exceed the desired regulated level. Thus, the minimum load current must be above a threshold current to prevent this. The minimum load reduces the efficiency of the converter.

FIG. 1 illustrates one type of flyback converter 10 using a minimum load and which detects the output voltage VOUT by detecting the voltage at the primary winding when the power switch MOSFET M1 is turned off during the discharge (or flyback) cycle. No optocoupler or third winding is used to detect VOUT.

A transformer 12 has a primary winding L1 and a secondary winding L2. The MOSFET M1 is controlled by an output regulation and control circuit 14 to connect the winding L1 between the input voltage VIN (e.g., a battery voltage) and ground during a charging cycle.

To achieve a regulated VOUT, the MOSFET M1 is turned off after a controlled time, and the synchronous rectifier MOSFET M2 is turned on. The current through winding L2 is transferred to the load and the smoothing capacitor C1 at the required voltage.

For regulation feedback, the circuit 14 detects the voltage at the drain of MOSFET M1 during the discharge cycle (MOSFET M1 is off). Sensing an output voltage by a signal at the primary side of the transformer is sometimes referred to as primary side sensing. The drain voltage is related to a winding ratio of L1 and L2, and the voltage across winding L2 is the output voltage Vout plus the voltage drop across MOSFET M2 (assuming MOSFET M2 is on). The user selects the value of a feedback resistor RFB and the value of a reference resistor RREF such that (RFB/RREF)*Vref equals the desired regulated voltage, where Vref is an internal bandgap reference voltage applied to an internal error amplifier. Such primary side sensing circuits for detecting VOUT are well known and need not be described in detail. The full data sheet for the Linear Technology LT3573 flyback converter, incorporated herein by reference and available on-line, describes the operation of the feedback circuit. This operation is also described in U.S. Pat. Nos. 7,471,522 and 7,463,497, assigned to the present assignee and incorporated herein by reference. Other known primary side voltage sensing techniques may be used.

The circuit 14 continues to control the duty cycle of MOSFET M1, at a variable frequency or a fixed frequency, to regulate VOUT based on the sensed voltage.

The circuit 14 may also directly control the synchronous rectifier MOSFET M2 to turn on when MOSFET M1 turns off, or an automatic synchronous switch control circuit 16 may control MOSFET M2 to turn on at the proper times. MOSFETs M1 and M2 are typically never on at the same time. The diode D2 represents the drain-body diode of the MOSFET M2.

The output regulation and control circuit 14 may use any type of conventional technique to regulate, including current mode, voltage mode, or other modes.

When the load is above a certain threshold current, conventional operation of the converter 10 is used to accurately regulate VOUT. However, when the actual load falls below the threshold current, the required minimum duty cycle of the converter 10 generates too much current and causes VOUT to rise above the regulated voltage. Such light load operation still requires a minimum duty cycle to sample the output voltage on the primary winding L1. In the event that the actual load is a type that has a standby mode that draws very little power, the converter 10 is provided with a minimum load current resistor R1 to help dissipate the winding L2 current so regulation can be maintained during the periodic cycling of MOSFETs M1 and M2. Alternatively, or in conjunction, a zener diode D3 is used to ensure VOUT does not rise above a threshold level. Resistor R1 and zener diode D3 are optional, since the minimum current drawn by the actual load may be sufficient to substantially maintain regulation at the lightest load current.

FIG. 2 illustrates the current through the primary winding L1, the current through the secondary winding L2, and the voltage VM1 across the MOSFET M1 for a relatively low duty cycle operation. It may be assumed that the actual load current is below the minimum current set by the minimum current load resistor R1.

At time T1, the MOSFET M1 turns on to charge the primary winding L1, causing a ramping current to flow in winding L1. MOSFET M2 is off at this time.

After a variable or fixed time, at time T2, MOSFET M1 shuts off and MOSFET M2 turns on. This may be at the minimum duty cycle. This ceases current in the primary winding L1 and causes the current through the secondary winding L2 to ramp down while charging the output capacitor C1 and providing current to the load. The voltage across the MOSFET M1 is related to the output voltage VOUT and is sampled during this time by the circuit 14. The current supplied to the capacitor C1 during this light load condition may increase VOUT beyond the avalanche voltage of the zener diode D3, clamping VOUT to that value.

At time T3, the secondary winding L2 current ramps down to zero and the MOSFET M2 turns off to cause a discontinuous mode. MOSFET M2 may be turned off by a circuit that detects a slight reversal of current through the winding L2 by detecting the voltage across MOSFET M2.

After time T3, the parasitic capacitance of MOSFET M1 and the inductance of winding L1 creates an oscillating tank circuit.

At time T4, MOSFET M1 turns on again, and the cycle repeats, which may be the minimum duty cycle.

Additional detail of various converter circuits are described in U.S. Pat. Nos. 5,481,178; 6,127,815; 6,304,066; and 6,307,356, assigned to the present assignee and incorporated herein by reference.

During a medium to high current mode of the converter 10, there may be no discontinuous operation, and the converter 10 may operate at a fixed frequency with a variable duty cycle to regulate the output voltage. Such an operation may be conventional.

During the light load condition of the load, such as a standby mode, it is important that the converter 10 draw as little current as possible to extend battery life. Such standby modes typically occur for relatively long periods. It would be desirable to not require a minimum current load circuit (e.g., resistor R1) to enable the converter 10 to regulate VOUT when the actual load is in its standby mode. By doing away with the minimum current circuit, while still achieving substantial regulation when the actual load is drawing zero or very little current, efficiency is improved and battery life is increased.

SUMMARY

A flyback converter is disclosed that uses primary side sensing to sense the output voltage VOUT but does not need a minimum load current resistor or zener diode to prevent the output voltage from increasing substantially beyond regulation during light load conditions. The converter may use any technique for regulating the output voltage during high to medium load currents, such as current mode or voltage mode.

During light load currents, when the converter operates in a discontinuous mode (synchronous rectifier is off) while operating at a minimum duty cycle, the output voltage is detected on the secondary side of the transformer and compared to a threshold voltage to determine whether the output voltage has exceeded the regulated voltage. The output voltage may be directly detected at the output terminal of the converter or a resistor divider may be used. Once it is determined that the output voltage has exceeded the threshold, the synchronous rectifier is then briefly turned on to draw a reverse current through the secondary winding to slightly discharge the output capacitor to lower the output voltage to approximately the regulated voltage. When the synchronous rectifier is then turned off, the stored energy in transformer causes a ramping current in the primary winding through the drain-body diode of the power MOSFET (the power MOSFET is off). The excess energy is thus recycled in the power supply (e.g., a battery) rather than being wasted. In other words, excess power is transferred from the output side of the converter to the input side. Accordingly, no minimum load current resistor or zener diode is needed, and the converter is much more efficient than the prior art converter of FIG. 1 at light load currents.

To ensure that there has been enough time for the primary side sensing to occur for controlling the regulation, a timer may be employed to detect that the synchronous rectifier has been off a sufficient time before being cycled on again.

In one embodiment, the synchronous rectifier is turned on long enough to drop the output voltage below the threshold. In another embodiment, the synchronous rectifier may be cycled on and off multiple times to reduce ripple if the output voltage remains over the threshold.

At the beginning of the next converter switching cycle, the power switch is then turned on, at the minimum duty cycle, to charge the primary winding, and the cycles repeat until the load comes out of its standby mode. Thereafter, the converter operates normally.

The invention may be used in conjunction with all types of primary side sensing circuits and using any suitable operation mode, such as current mode, voltage mode, burst mode, etc.

Although a disclosed embodiment employs primary side sensing by detecting the voltage at the drain of a MOSFET switch, the primary side sensing may also be by detecting the voltage across an auxiliary winding on the input side, where the voltage is related to the voltage across the secondary winding.

BRIEF DESCRIPTION OF THE DRAWINGS

Elements that are the same or equivalent are labeled with the same numeral.

DETAILED DESCRIPTION

Figure 1:
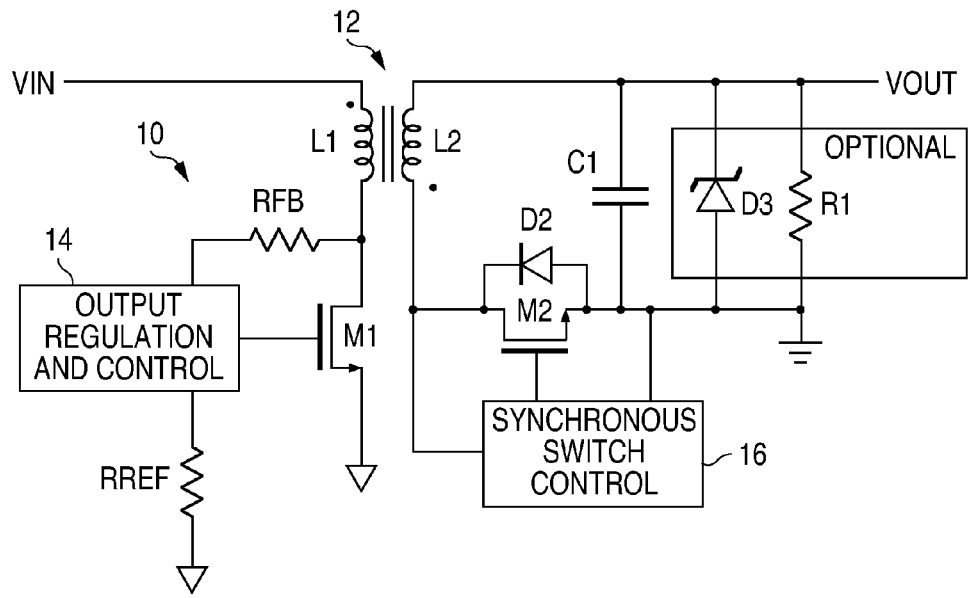
FIG. 1 illustrates a prior art flyback converter.
Figure 2:
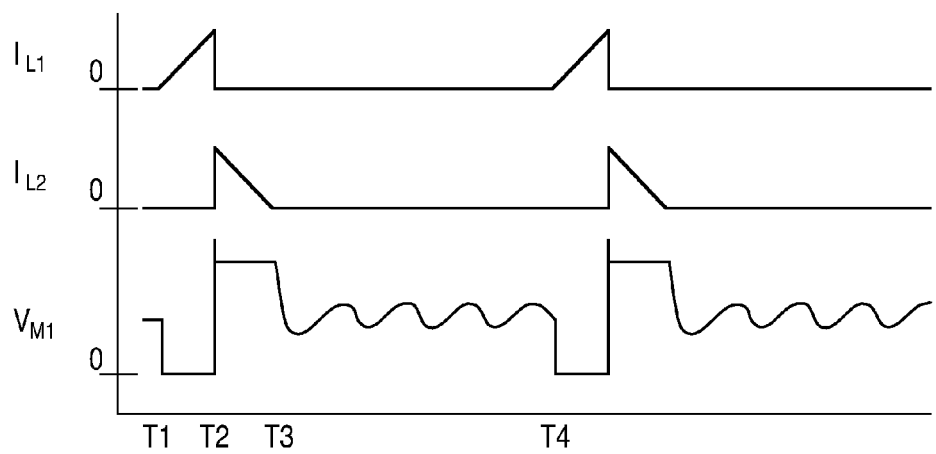
FIG. 2 illustrates the currents through the windings of the transformer in FIG. 1 as well as the voltage across the power switch when the converter provides a light load current.
Figure 3:
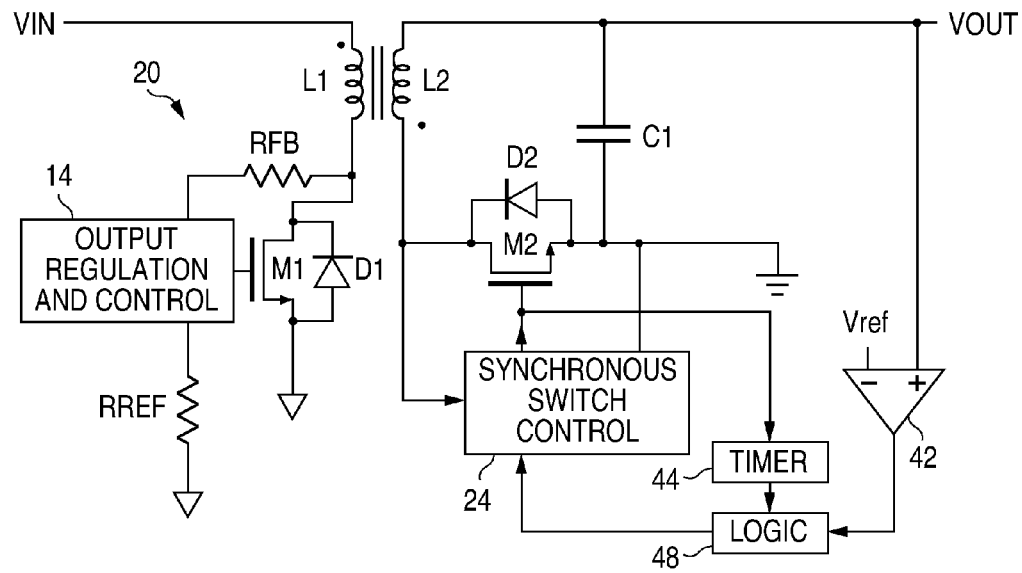
FIG. 3 illustrates a flyback converter employing the present invention for cycling the synchronous rectifier to prevent an over-voltage condition when the converter provides a light load current or no load current.

FIG. 3 represents any of the many types of flyback converters using primary side sensing of the output voltage VOUT. Since the invention only relates to operation of the converter during a light load current condition, when the converter operates in the discontinuous mode and an over-voltage occurs, any conventional aspects of flyback converters may be used for medium to high load currents. Since such conventional circuitry is well known, and there are a variety of types, such a current mode, voltage mode, variable frequency, fixed frequency, etc., there is no need to describe such conventional circuitry in detail. The description of the conventional aspects of the converter 10 of FIG. 1 apply to the converter 20 of FIG. 3.

For medium to high load current operation, the converter 20 periodically turns MOSFET M1 on to charge the primary winding L1. The on-time of MOSFET M1 is dependent on a feedback voltage at the drain of MOSFET M1 related to VOUT, which was sampled at a time when the synchronous rectifier MOSFET M2 was on and current was flowing through the secondary winding L2. The feedback voltage is used to create a value, using resistors RFB and RREF, that is compared to a reference voltage by an error amplifier. The error signal generated by the error amplifier sets the time that the MOSFET M1 is on during the cycle (i.e., sets the duty cycle). This may be conventional.

In one embodiment, the converter 20 is a voltage mode type where the output regulation and control circuit 14 compares the error signal to a sawtooth waveform. When they cross, for medium and high current loads, the MOSFET M1 is turned off to establish the duty cycle needed to precisely regulate the voltage.

If the converter 20 were a current mode type, the MOSFET M1 remains on until a ramping current signal through the MOSFET M1 crosses the error signal.

The regulation may use any other type of primary side sensing, including using an auxilliary winding on the input side to detect the output voltage.

When the MOSFET M1 turns off, the MOSFET M2 turns on. Many conventional techniques may be used to sense when to turn the MOSFET M2 on. In one embodiment, the synchronous switch control 24 detects a voltage across the MOSFET M2. When the MOSFET M1 switches off, the voltage across MOSFET M2 will become negative (drain voltage lower than ground), and this sensed voltage reversal causes the synchronous switch control circuit 24 to turn on MOSFET M2. When the secondary winding L2 current ramps down to zero, the drain voltage will rise, causing the synchronous switch control circuit 24 to turn off MOSFET M2. With each cycle of MOSFETs M1 and M2 turning on and off, a current pulse is provided to the output, which is smoothed by the capacitor C1 to generate a DC regulated output voltage VOUT.

Various other conventional schemes may also be used to control the turning on and off of the MOSFET M2 to emulate a diode.

The regulation scheme may be a variable frequency type or a fixed frequency type.

Figure 5:
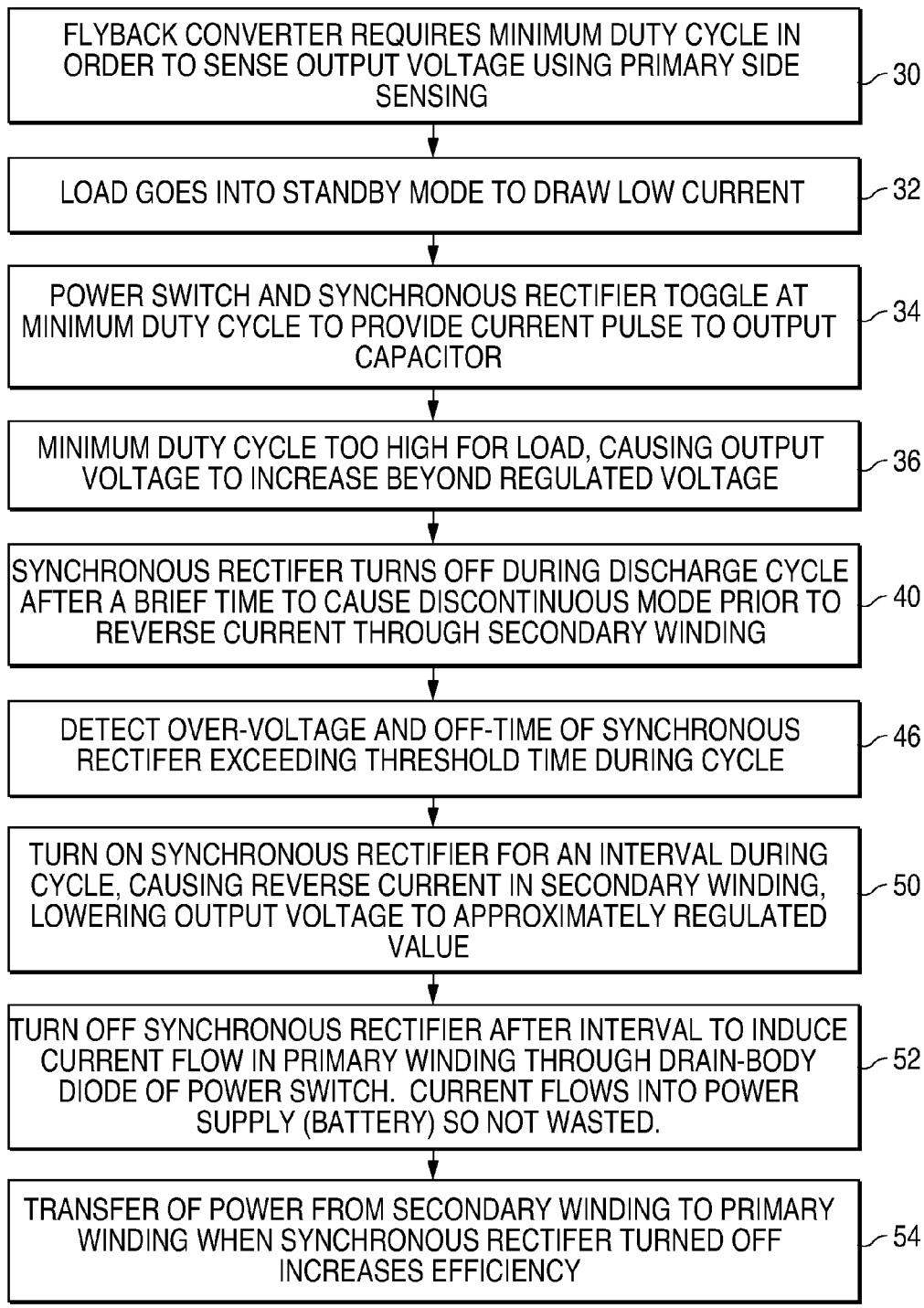
FIG. 5 is a flowchart identifying various events occurring during use of the invention.

FIG. 5 is a flowchart describing various steps performed by the converter 20 in a light load, minimum duty cycle mode, and such steps will be referenced in the below description.

For primary side sensing, the MOSFETs must trigger to generate a voltage across the primary winding L1 in order to detect VOUT. At light loads, very little or no current may be drawn, yet the converter 20 must still perform a periodic minimum duty cycle to detect VOUT (step 30 in FIG. 5). The light load may be due to the load going into a standby mode (step 32 in FIG. 5). In the event, the minimum duty cycle is too high for the required load current, VOUT will rise above the desired regulated value (steps 34 and 36 in FIG. 5).

Figure 4:
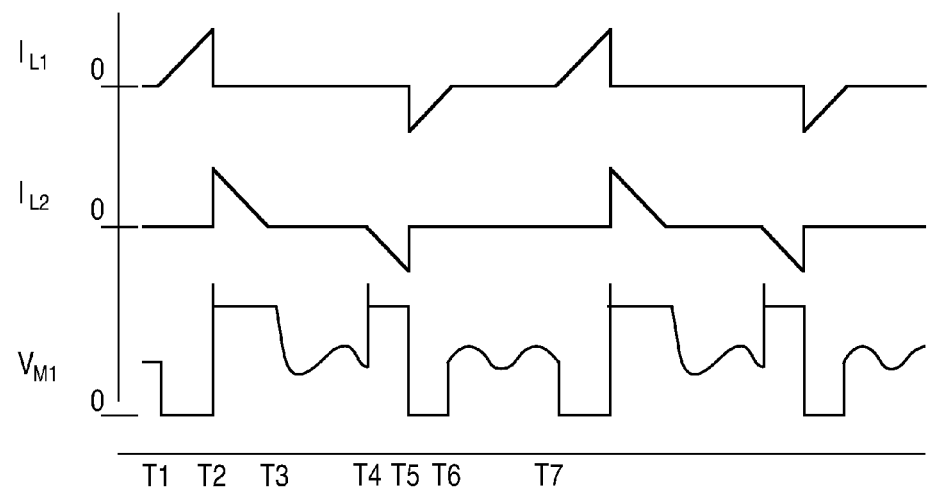
FIG. 4 illustrates the currents through the windings of the transformer in FIG. 3 as well as the voltage across the power switch when the converter provides a light load current or no load current.

FIG. 4 illustrates the currents in the primary winding L1 and secondary winding L2 as well as the voltage across the MOSFET M1 during a light load condition in accordance with the invention.

At time T1, the MOSFET M1 turns on, which may be under the control of a clock for a fixed frequency type of operation. This causes a ramping current to flow through the primary winding L1.

After a minimum time (for a minimum duty cycle), at time T2, the MOSFET M1 is turned off. Such a minimum time may be set by a timer in the output regulation and control circuit 14 that prevents the MOSFET M1 from being turned off prior to a predetermined minimum time. Such circuitry is conventional.

At time T2, the synchronous switch control circuit 24 detects the reversal of voltage across the secondary winding L2 and turns on the MOSFET M2. This generates a ramp down current through the secondary winding L2, which charges the capacitor C1 above the desired regulated VOUT level, due to the light load requirements.

At time T3, the secondary winding L2 current has ramped down to zero. The synchronous switch control circuit 24 detects the slight rise in drain voltage and turns off the MOSFET M2, creating a discontinuous mode (step 40 in FIG. 5). If MOSFET M2 had not been turned off, a reverse current would flow through the secondary winding L2. Conventional circuitry may be used to detect the onset of the reversal of current in the secondary winding L2 and switch off the MOSFET M2, where this may occur slightly before or after the actual current reversal in the secondary winding L2.

Between the times T2 and T3, VOUT may be sampled by the output regulation and control circuit 14 to determine the duty cycle of the MOSFET M1 during the next cycle. It is conventional, although not required, for the sampling to occur at approximately the time that the current through the secondary winding L2 is zero. During light load currents, the duty cycle will be a predetermined minimum duty cycle.

A comparator 42 receives VOUT or a voltage proportional to VOUT, such as a resistor-divided voltage, and compares it to a reference voltage Vref slightly above the desired regulated voltage. Vref may be equivalent to VOUT×1.05.

At the same time, a timer 44 detects that the MOSFET M2 has been off a minimum amount of time to ensure that VOUT has been sampled on the primary side. The timer 44 is optional since it may not be needed in some cases, such as if the sampling occurs before the current though the secondary winding L2 is zero. If an over-voltage is detected and if the timer 44 indicates that the MOSFET M2 has been off a sufficient amount of time (step 46 in FIG. 5), a logic circuit 48 triggers the synchronous switch control circuit 24 to turn on MOSFET M2 to conduct a reverse current through the secondary winding L2 at time T4 (step 50 in FIG. 5). This turn-on time may be a fixed time or may occur for a time to sufficiently lower VOUT to trigger the comparator 42. If the turn on time is a fixed time, multiple cycles of turning on and off the MOSFET M2 may be used to lower VOUT to minimize ripple.

During the time that the MOSFET M2 is on, between times T4-T5, a voltage is across the MOSFET M1 related to the voltage across the secondary winding L2.

At time T5, the MOSFET M2 is turned off, which causes a reversal of the voltage across the primary winding L1. This causes the drain-body diode D1 of the MOSFET M1 to conduct, as shown between the times T5-T6, which draws a current through the primary winding L1 between times T5-T6 (step 52 in FIG. 5). Such current flows into the battery supplying VIN, so the power is not wasted. Thus, excess power has been transferred from the secondary side to the primary side to improve the efficiency of the converter 20 at light loads, and no minimum load current resistor or zener diode is needed to mitigate over-voltages (step 54 in FIG. 5). In some cases, MOSFET M1 may turn on during the time that the diode D1 is conducting, such as when a new charging cycle starts pursuant to a clock pulse.

At the times when both MOSFETs are off, a tank circuit is created, causing oscillations across the MOSFET M1.

In another embodiment, instead of the drain-body diode D1 conducting the current through the primary winding L1 during times T5-T6, after the reverse current interval, a sense circuit could be added that senses the change in voltage at the primary winding L1 and turns MOSFET M1 on to conduct the excess power into the power supply. Such control of the MOSFET M1 may be independent of the output regulation and control circuit 14, since the circuit 14 will usually only turn MOSFET M1 on at the beginning of a clock cycle. Such a technique may be useful if the power switch did not include an inherent diode between the primary winding L1 and ground.

In yet another embodiment, the comparator 42 detects that the output voltage is greater than the desired regulated voltage and keeps the MOSFET M2 on as long as required to reduce the output voltage below Vref. For example, with respect to FIG. 4, at time T3, the synchronous switch control 24, comparator 42, and logic 48 operate to keep the MOSFET M2 on to conduct a reverse current through the secondary winding L2, to lower the output voltage below Vref, without first entering a discontinuous mode. Once the comparator 42 detects that the output voltage has fallen below Vref, the comparator 42 triggers to cause the MOSFET M2 to turn off and causing a discontinuous mode. In another embodiment, the discontinuous mode may be any duration (including zero) after the current through the secondary winding L2 drops to zero. The comparator 42 may have hysteresis.

The invention may be employed during a fixed frequency operation of the converter 20 or during a special light load mode of operation where the MOSFET M1 is not turned on at a fixed frequency.

The MOSFETs may instead be bipolar transistors.

Those skilled in the art may design the various functional blocks in many ways without undue experimentation and using conventional circuit techniques.

While particular embodiments of the present invention have been shown and described, it will be obvious to those skilled in the art that changes and modifications may be made without departing from this invention in its broader aspects. The appended claims are to encompass within their scope all such changes and modifications as fall within the true spirit and scope of this invention.

What is claimed is:

1. A method for operating a flyback converter with a low current load, the converter having a transformer with a primary winding and a secondary winding, the primary winding being coupled to a power source and a first transistor for conducting a current through the primary winding when the first transistor is on, the secondary winding being coupled to a second transistor for conducting a current through the secondary winding when the second transistor is on, the converter having a primary side regulated duty cycle for load currents above a threshold level and a primary side minimum duty cycle for load currents below the threshold level for periodically sensing an output voltage of the converter using primary side sensing, the converter having an output capacitor, the method comprising:

turning on the first transistor for a first interval at the minimum duty cycle, due to the load current being below the threshold level, to draw a current through the primary winding;

turning on the second transistor after the first transistor has turned off to draw a current through the secondary winding to charge the output capacitor;

performing the primary side sensing of the output voltage;

determining whether the output voltage has exceeded a predetermined regulated voltage by a certain threshold to detect an over-voltage condition, resulting from the low current load;

if the over-voltage condition is detected, turning on the second transistor for a second interval to conduct a reverse current through the secondary winding to reduce the output voltage; and after the second interval, turning off the second transistor to cease current flow in the secondary winding and to cause a current to flow in the primary winding and into the power source, such that excess power is transferred from a secondary side of the transformer to a primary side of the transformer to reduce the over-voltage during low load current conditions.

2. The method of claim 1 wherein the second interval is a predetermined fixed interval.

3. The method of claim 1 wherein the second interval is a variable interval needed to reduce the output voltage below the threshold.

4. The method of claim 1 wherein the second transistor is turned on and off multiple times prior to the first transistor being turned on.

5. The method of claim 1 further comprising:

sensing a voltage representative of the output voltage at a primary side of the transformer to provide a feedback signal for regulating the output voltage;

for loads drawing a current greater than the low load current, controlling a duty cycle of the first transistor to maintain the output voltage at a regulated voltage; and for loads drawing a current less than or equal to the threshold level, switching the first transistor at the minimum duty cycle.

6. The method of claim 1 wherein the first transistor is a first MOSFET having a drain-body diode that conducts current through the primary winding when the second transistor has turned off after the second interval.

7. The method of claim 1 wherein the primary side sensing comprises sensing a voltage at an end of the primary winding.

8. The method of claim 1 wherein the step of turning off the second transistor to cease current flow in the secondary winding and cause a current to flow in the primary winding occurs without turning on the first transistor.

9. The method of claim 1 wherein, after the step of turning on the second transistor after the first transistor has turned off to draw a current through the secondary winding to charge the output capacitor, the method further comprises turning off the second transistor when current through the secondary winding has dropped to approximately zero to cause a discontinuous mode, and wherein the step of turning on the second transistor for a second interval comprises turning back on the second transistor after the second transistor has been turned off, prior to the first transistor being turned back on.

10. The method of claim 9 further comprising sensing that the second transistor has been off for a predetermined period prior to allowing the second transistor to be turned on for the second interval.

11. The method of claim 1 wherein the second interval occurs immediately after current through the secondary winding has dropped to approximately zero so that there is no discontinuous mode until after the second interval.

12. A flyback converter comprising:

a transformer with a primary winding and a secondary winding, the primary winding being coupled to a power source;

a first transistor coupled to the primary winding for conducting a current through the primary winding when the first transistor is on;

a second transistor for conducting a current through the secondary winding when the second transistor is on;

a regulator coupled to the first transistor for controlling a duty cycle of the first transistor to regulate the output voltage of the converter, the regulator being configured to control the first transistor to have a primary side regulated duty cycle for load currents above a threshold level and a primary side minimum duty cycle for load currents below the threshold level;

an output voltage sensor circuit coupled to the transformer for sensing an output voltage of the converter using primary side sensing;

an output capacitor coupled to an output terminal of the converter;

a synchronous rectifier controller coupled to the second transistor for controlling the second transistor to be on or off;

a comparator having one input coupled to receive a voltage corresponding to the output voltage of the converter and having another input connected to a reference voltage representing a threshold voltage exceeding a regulated voltage of the converter, wherein triggering of the comparator signifies an over-voltage condition;

during operation of the regulator at the minimum duty cycle with the load currents below the threshold level, an output of the comparator being coupled so as to control the synchronous rectifier controller to turn the second transistor on for an interval to conduct a reverse current through the secondary winding, upon the over-voltage condition being detected, to reduce the output voltage of the converter to mitigate the over-voltage condition; and a diode coupled to the primary winding to conduct a current through the primary winding after the interval without turning on the first transistor, such that power is transferred from a secondary side of the transformer to the power source while mitigating the over-voltage condition.

13. The converter of claim 12 wherein the first transistor is a MOSFET and the diode is a drain-body diode of the MOSFET.

14. The converter of claim 12 further comprising a logic circuit coupled between the comparator and the synchronous rectifier controller.

15. The converter of claim 14 further comprising a timer circuit detecting that the second transistor has been off for a threshold period of time and, if so, controlling the logic circuit to turn on the second transistor for the interval during the over-voltage condition.

16. The converter of claim 12 wherein the interval that the second transistor is on to conduct the reverse current is a fixed interval.

17. The converter of claim 12 wherein the interval that the second transistor is on to conduct the reverse current is a variable interval needed to reduce the output voltage to below the threshold voltage.

18. The converter of claim 12 wherein the primary side sensing detects a voltage at a node between the primary winding and the first transistor.

19. The converter of claim 12 wherein the synchronous rectifier is also configured to turn the second transistor off at approximately a time when current through the secondary winding is zero to create a discontinuous mode of the converter, wherein the output of the comparator is coupled so as to control the synchronous rectifier controller to turn the second transistor on for an interval after the discontinuous mode to conduct the reverse current through the secondary winding to reduce the output voltage of the converter to mitigate the over-voltage condition.

* * * * *